United States Patent
Feinstein

(10) Patent No.: US 11,192,081 B2
(45) Date of Patent: Dec. 7, 2021

(54) BAYONET CATALYTIC REACTOR

(71) Applicant: ZONEFLOW REACTOR TECHNOLOGIES, LLC, Windsor, CT (US)

(72) Inventor: Jonathan Jay Feinstein, Windsor, CT (US)

(73) Assignee: ZONEFLOW REACTOR TECHNOLOGIES, LLC, Windsor, CT (US)

( * ) Notice: Subject to any disclaimer, the term of this patent is extended or adjusted under 35 U.S.C. 154(b) by 0 days.

(21) Appl. No.: 16/920,562

(22) Filed: Jul. 3, 2020

(65) Prior Publication Data

US 2021/0001297 A1   Jan. 7, 2021

Related U.S. Application Data

(60) Provisional application No. 62/871,047, filed on Jul. 5, 2019.

(51) Int. Cl.
*B01J 8/00* (2006.01)
*B01J 8/02* (2006.01)
(Continued)

(52) U.S. Cl.
CPC .......... *B01J 8/0411* (2013.01); *B01J 8/0214* (2013.01); *B01J 8/062* (2013.01); *B01J 19/244* (2013.01);
(Continued)

(58) Field of Classification Search
CPC ..... B01J 8/00; B01J 8/02; B01J 8/0207; B01J 8/0214; B01J 8/0242; B01J 8/0257; B01J 8/04; B01J 8/0407; B01J 8/0411; B01J 8/00446; B01J 8/0461; B01J 8/465; B01J 8/06; B01J 8/062; B01J 19/00; B01J 19/24; B01J 19/2415; B01J 19/244; B01J 19/248; B01J 19/2485; B01J 19/30–325; B01J 2208/00; B01J 2208/00008; B01J 2208/00017; B01J 2208/00106; B01J 2208/00168; B01J 2208/00212; B01J 2208/00238; B01J 2208/00477; B01J 2208/00495; B01J 2208/00504; B01J 2208/00796; B01J 2219/00; B01J 2219/24; B01J 2219/2401; B01J 2219/2402; B01J 2219/2441; B01J 2219/2444; B01J 2219/30; B01J 2219/304; B01J 2219/30475; B01J 2219/32; B01J 2219/322; B01J 2219/32296; B01J 2219/324; B01J 2219/32466

See application file for complete search history.

(56) References Cited

U.S. PATENT DOCUMENTS

| | | | | |
|---|---|---|---|---|
| 5,876,469 A | * | 3/1999 | Moriya | .......... C01B 3/384 48/197 R |
| 9,592,487 B2 | * | 3/2017 | Ralston | .......... B01J 8/062 |
| 9,662,637 B2 | * | 5/2017 | Qi | .......... B01J 21/063 |

* cited by examiner

*Primary Examiner* — Natasha E Young
(74) *Attorney, Agent, or Firm* — Knobbe, Martens, Olson & Bear, LLP

(57) ABSTRACT

A bayonet reactor including a catalytic reactor in the form of an annular structured packing is provided with increased surface area for the transfer of heat between annulus gas and return gas, an increased coefficient of heat transfer between the annulus and return gases, and a reduced overall pressure drop relative to conventional reactors. The reactors of the present technology can enable intensified catalytic processing.

20 Claims, 1 Drawing Sheet

(51) Int. Cl.
*B01J 8/04* (2006.01)
*B01J 8/06* (2006.01)
*B01J 19/00* (2006.01)
*B01J 19/24* (2006.01)
*B01J 19/30* (2006.01)
*B01J 19/32* (2006.01)

(52) U.S. Cl.
CPC ................ *B01J 2208/00796* (2013.01); *B01J 2219/2444* (2013.01); *B01J 2219/32296* (2013.01)

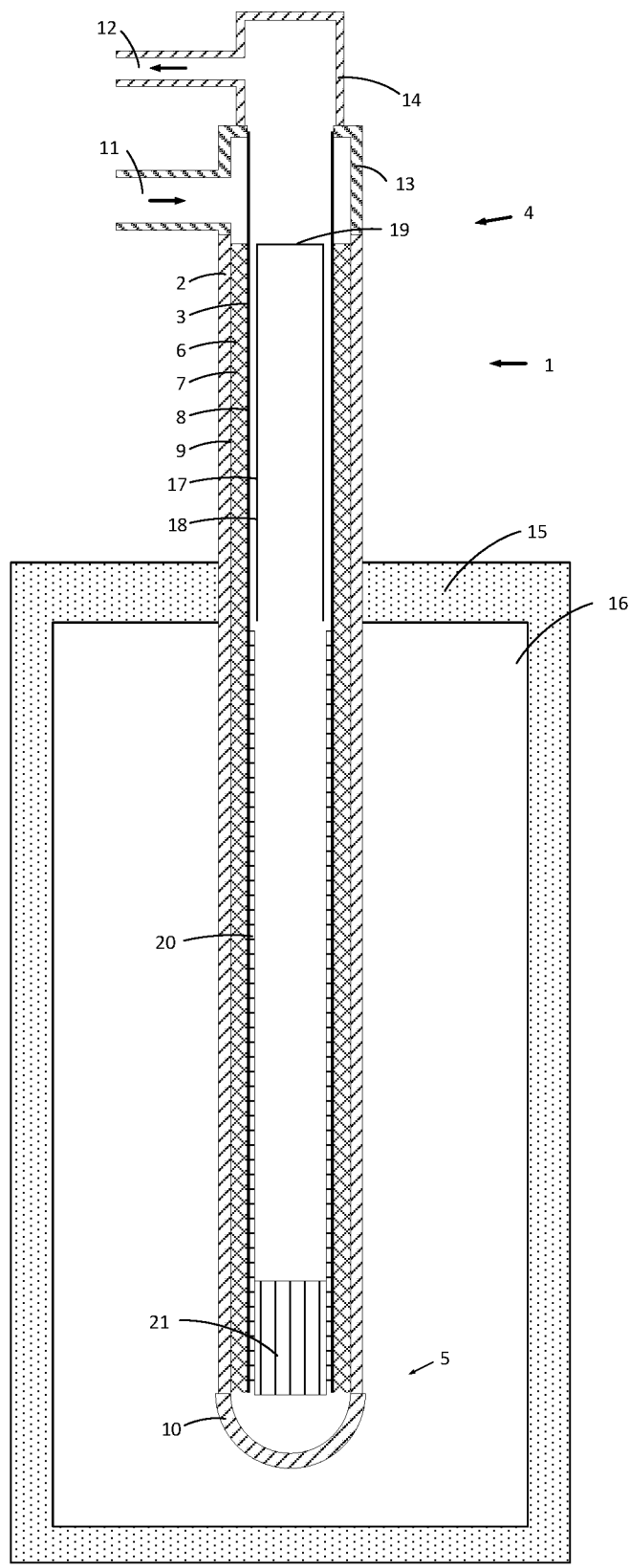

BAYONET CATALYTIC REACTOR

INCORPORATION BY REFERENCE

This application claims the benefit of U.S. Provisional Application Ser. No. 62/871,047, filed Jul. 5, 2019, titled "BAYONET CATALYTIC REACTOR," the entirety of which is incorporated by reference herein.

FIELD

The present disclosure relates to the field of non-adiabatic catalytic reactors, and particularly as used for steam reformation and other processes.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one aspect described herein, a bayonet catalytic reactor comprises an outer tube having an open first end and a closed second end; an inner tube disposed at least partially within the outer tube, the inner tube having an open first end and an open second end; and a catalytic reactor comprising a structured packing disposed within an annulus defined by an inner diameter of the outer tube and an outer diameter of the inner tube; wherein the outer diameter of the inner tube is at least 0.45 times the inner diameter of the outer tube.

In some embodiments, the outer diameter of the inner tube is at least 0.63 times the inner diameter of the outer tube.

In some embodiments, the outer diameter of the inner tube is at least 0.77 times the inner diameter of the outer tube.

In some embodiments, the bayonet catalytic reactor further comprises a second catalytic reactor disposed within the inner tube proximate the second end of the inner tube.

In some embodiments, the second catalytic reactor is a structured reactor comprising a honeycomb catalytic reactor.

In some embodiments, the second catalytic reactor extends from the second end of the inner tube toward the first end of the inner tube to a distance less than 50% of the distance from the second end of the inner tube to the first end of the inner tube.

In some embodiments, the bayonet catalytic reactor is a steam reforming reactor.

In some embodiments, the bayonet catalytic reactor further comprises insulation disposed within the inner tube, the insulation configured to impede heat transfer between gas flowing through the annulus and gas flowing through the inner tube.

In another aspect described herein, a bayonet catalytic reactor comprises an outer tube having an open first and end a closed second end; an inner tube disposed at least partially within the outer tube, the inner tube having an open first end and an open second end; a catalytic reactor comprising a structured packing disposed within a first annulus defined by an inner diameter of the outer tube and an outer diameter of the inner tube; and a device disposed within the inner tube for enhancing heat transfer between the inner tube and a fluid flowing within the inner tube.

In some embodiments, the device comprises a third tube having a blockage therein preventing fluid flow through the third tube, wherein a second annulus is defined by an inner diameter of the inner tube and an outer diameter of the third tube.

In some embodiments, the second annulus has a cross sectional area less than 0.6 times a cross-sectional area of the first annulus.

In some embodiments, the second annulus has a cross sectional area less than 0.15 times a cross-sectional area of the first annulus.

In some embodiments, the second ends of the outer tube and the inner tube are disposed within a furnace, and the first ends of the outer tube and the inner tube are disposed outside the furnace.

In some embodiments, the device extends from the first end of the inner tube toward the second end of the inner tube to a distance less than 90% of the distance from the first end of the inner tube to the second end of the inner tube.

In some embodiments, the device extends from the first end of the inner tube toward the second end of the inner tube to a distance less than 70% of the distance from the first end of the inner tube to the second end of the inner tube.

In some embodiments, the bayonet catalytic reactor further comprises a second catalytic reactor disposed within the inner tube proximate the second end of the inner tube.

In some embodiments, the second catalytic reactor is a structured reactor comprising a honeycomb catalytic reactor.

In some embodiments, the second catalytic reactor extends from the second end of the inner tube toward the first end of the inner tube to a distance less than 50% of the distance from the second end of the inner tube to the first end of the inner tube.

In some embodiments, the reactor is a steam reforming reactor.

In some embodiments, the bayonet catalytic reactor further comprises insulation disposed within the inner tube, the insulation configured to impede heat transfer between gas flowing through the first annulus and gas flowing through the inner tube.

BRIEF DESCRIPTION OF THE DRAWINGS

FIG. 1 shows a longitudinal cross section of a reactor structure in accordance with an example embodiment of the present technology.

DETAILED DESCRIPTION

Bayonet reactors can be used to promote endothermic steam reforming reactions. Bayonet steam reforming reactors may contain a catalytic component, which can be in the form of a packed bed, in the form of a structured packing, or the like. The catalytic component, such as the packed bed, may be disposed within an annulus defined between a first outer tube and a second inner tube. Reacting gas may enter the bayonet reactor through the annulus and react with the catalytic component before exiting as return gas in the inner tube. The portion of the bayonet reactor including the catalytic reactor may be within a furnace to provide heat to the reacting gas. A bayonet steam reforming reactor can be used advantageously compared to a single pass reactor for a number of reasons including, for example, the return gas in the inner tube can supply heat to the reacting gas in the annulus in addition to the heat supplied to the reacting gas from a furnace through the outer tube. Heat from the return gas constitutes a form of additional heat recovery and/or process intensification compared to a single pass reactor.

Gas exiting non-adiabatic catalytic reactors may fall short of the equilibrium conversion of the reactants for the given exit temperature and pressure. This departure from equilibrium composition is often referred to as the "approach to equilibrium" or ATE. The ATE is measured as the difference between the actual gas exit temperature and the temperature at which the gas composition exiting the reactor would be at equilibrium. For example, existing commercial steam reforming reactors may provide an ATE of −5° to −15° C., meaning the gas exits 5° to 15° C. hotter than the temperature at which its composition would be at equilibrium. The negative ATE results in the exit gas being undesirably hotter but less converted to hydrogen product than if the gas had come to equilibrium.

Heat from the return gas in a bayonet reactor constitutes a form of additional heat recovery and/or process intensification compared to a single pass reactor. For example, in a bayonet reactor, more heat can be supplied to support the endothermic reforming reactions within the same outer tube surface area and with the same heat flux through the outer tube, where increased heat flux through the tube of a single pass reactor could otherwise cause that tube to overheat for its design strength. Good heat transfer is therefore sought between the reacting gas in the annulus and the return gas in the inner tube. The packing of the catalytic component within the annulus may be designed to create flow patterns within the annulus to promote heat transfer between the annulus gas and the walls of the s inner tube. As such, the heat transfer coefficient between the return gas and inner tube which contains no packing is typically lower than the heat transfer coefficient between the annulus gas and the inner tube.

In steam reforming bayonet reactors using a catalyst component in the form of a packed bed, the high pressure drop of gas passing through the packed bed may have a substantial amount, for example 90% to 95%, of the gross cross-sectional area of the first tube allocated to the flow of gas through the annulus between the outer and inner tubes, leaving only 5% to 10% cross-sectional area for the return gas flow within the second tube. In some embodiments, the diameter of the inner tube can be smaller than the diameter of the outer tube, and in some cases, significantly smaller. The difference in cross-sectional area or diameter between the inner and outer tubes can result in an increased flow velocity of the return gas in the inner tube. The resultant high velocity of the return gas enhances the heat transfer coefficient between the return gas and the inner tube, or between the return gas and the annulus gas. This also results in the surface area of the inner tube for the transfer of heat from the return gas to the annulus gas to be small, which impedes heat recovery from the return gas.

Structured packings may have a lower pressure drop than packed beds for the same tube geometry and flow.

Upon cooling the product syngas from steam reforming, the syngas can react with tube alloys, causing severe corrosion by "metal dusting". Thermodynamically this reaction becomes more severe as the syngas cools, especially below 750° C., but the kinetics limit metal dusting at temperatures below about 600° C.

Some embodiments of the present disclosure describe systems and methods to improve the performance of a bayonet catalytic reactor in which the catalytic component is in the form of an annular structured packing. In some embodiments, greater surface area is provided for the transfer of heat between the annulus and return gases. In some embodiments, the coefficient of heat transfer between the annulus gas and return gas is increased. The bayonet catalytic reactor described herein may increase the rate at which fluids can be processed. Steam production may be reduced compared to existing forms of heat recovery in conventional single pass or bayonet steam reforming plants. The firing rate of the steam reforming furnace may be reduced. The duty of the process gas boiler for cooling the syngas may be reduced. Energy may be increased. In some embodiments, exposure of equipment to syngas conditions that promote metal dusting is minimized while cooling syngas from steam reforming exit conditions. Other advantages of the present disclosure will be apparent to those skilled in the art.

A single pass catalytic reactor generally refers to a reactor comprising a tube with first and second open ends, the tube containing a catalyst, wherein a fluid enters the first end, flows from the first end to the second end, and exits the second end. In a single pass catalytic reactor, all heat is supplied to or withdrawn from the fluid through the tube wall.

A bayonet catalytic reactor generally refers to a reactor comprising a first, outer tube and a second, inner tube disposed within the outer tube, wherein both tubes are open at a first end, the outer tube is closed at a second end opposite the first end, and the inner tube is open at its second end. Thus, fluid enters the first end into an annulus defined between the outer and inner tubes, flows to the second end, flows from the annulus into the inner tube at the second end due to the closed second end of the outer tube, returns within and along the length of the inner tube, and exits the first end of the inner tube. The annulus may contain a catalyst for reacting the fluid endothermically or exothermically within the annulus. For an endothermic reaction, heat from the environment such as a furnace is supplied through the first tube to the fluid within the annulus to supply at least some of the heat of reaction, and the fluid is heated as it travels from the first end to the second end. Heat may additionally be supplied to the fluid reacting within the annulus from the fluid within the inner tube. For an exothermic reaction, heat is withdrawn from the fluid within the annulus through the first tube to remove at least some of the heat of the reaction, and the fluid is cooled as it travels from the first end to the second end. Heat may additionally be withdrawn from the fluid reacting within the annulus into the fluid within the inner tube.

The gross cross-sectional area of a tube is the cross-sectional area of the volume enclosed by the inner surface of the wall of the tube, regardless of what lies within that volume.

The cross-sectional area of an annulus between an outer tube and an inner tube disposed within the outer tube is the transverse cross-sectional area between the inner diameter of the outer tube and the outer diameter of the inner tube, regardless of what lies within that cross section.

The "steam reforming" reaction includes chemical reactions between steam or carbon dioxide and a hydrocarbon, such as methane for example, to produce a syngas containing hydrogen and oxides of carbon.

By use of computational fluid dynamic (CFD) calculations it has been discovered that bayonet steam reforming reactors using a structured packing catalytic reactor can allocate at least 20%, at least 40%, at least 55%, or more of the gross cross sectional area of the outer tube to the flow of gas through the inner tube, leaving approximately up to 10 times as much of the first tube's gross cross sectional area for the return gas flow within the second tube as compared to bayonet reactors for steam reforming with packed beds.

It is further discovered that greater allocation of cross-sectional area for return gas flow permits the surface area of the inner tube to be 2 to 10 times greater for bayonet steam reforming reactors with structured packings reactors than for bayonet reactors with packed beds, enhancing heat transfer between the annulus and return gases relative to packed bed bayonet reactors. For example, it was discovered than an outer diameter of the inner tube should be at least 0.45 times, preferably at least 0.63, and most preferably at least 0.77 times the inner diameter of the outer tube for substantially greater heat transfer between the annulus gas and the inner tube relative to conventional systems in which the outer diameter of the inner tube is typically less than 0.2 or 0.1 times the inner diameter of the outer tube.

It is further discovered that in the allocation of cross-sectional areas for steam reforming reactors with a structured packing catalyst, the coefficient of heat transfer between the return gas and the inner tube will be much lower than between the annulus gas and the inner tube, which could severely limit heat transfer between the return and annulus gases. This discovery was made by further CFD modeling in which the respective heat transfer coefficients and heat fluxes were calculated. It was discovered that the above described allocation of cross-sectional areas for the annulus and inner tube for structured packings would cause the transfer of heat from the return gas to the inner tube to be insignificant for conventional steam reforming bayonet reactors. Accordingly, some embodiments of the present technology enhance this transfer of heat.

It has been discovered that the addition of an adiabatic reactor following a non-adiabatic reactor enhances conversion of feed stock components to products. It is further discovered that the adiabatic reactor could be accommodated within the volume of a bayonet reactor to increase the conversion of feedstock to desired products, improving the productivity of a multiplicity of production components within a steam reforming plant.

Referring now to FIG. 1, an example embodiment of an improved bayonet catalytic reactor in accordance with the present technology will now be described. FIG. 1 depicts a longitudinal cross-sectional view of the bayonet catalytic reactor 1 partially disposed within a furnace 16.

The bayonet catalytic reactor 1 includes a first, outer tube 2 shown with hatched lines, and a second, inner tube 3, shown as solid black lines, disposed at least partially within the first tube. The outer tube 2 and the inner tube 3 have corresponding first ends 4 and second ends 5. The first ends 4 of the outer tube 2 and the inner tube 3 can be proximate each other, and the second ends 5 of the outer tube 2 and the inner tube 3 can be proximate each other. Both the outer tube 2 and the inner tube 3 are open at the first ends 4. The outer tube 2 is closed at the second end 5, and the inner tube 3 is open at the second end 5. Thus, a first annulus 6 is formed between the inner diameter 9 of the outer tube 2 and the outer diameter 8 of the inner tube 3. The first annulus 6 is in fluid communication with the interior of the inner tube 3, and may be linked by the space within a closure 10 forming the closed second end 5 of the outer tube 2. The first annulus 6 can contain a catalytic reactor 7, shown with cross hatched lines, in the form of a structured packing or other suitable form.

The outer diameter 8 of the inner tube 3 may be at least 0.45 times the inner diameter 9 of the outer tube 2. For example, in some embodiments, the outer diameter 8 of the inner tube 3 may preferably be at least 0.63 times, or at least 0.77 times, the inner diameter 9 of the outer tube 2. The ratio of the outer diameter 8 of the inner tube 3 to the inner diameter 9 of the outer tube may be any other suitable ratio less than 1, for example, any ratio between 0.63 and 0.77 or greater than 0.77. Closure 10 closing the second end 5 of the outer tube 2 may be a simple cap and may have a thicker wall than the first tube.

The void space within the inner tube 3 and the void space within the first annulus 6 communicate with each other at the second end 5 and may not communicate with each other at any other location, such that they define a flow path from the first annulus 6 at the first end 4 to the void space within the inner tube 3 at the first end 4. Suitable fittings of any form are provided at the first ends 4 of the tubes to isolate the inlet 11 of the outer tube 2 from the outlet 12 of the inner tube 3. For example, fitting 13 may be a T-fitting, and fitting 14 may an L-fitting. Various flange arrangements may be substituted for fittings 13 and 14.

The first and second tubes are shown to penetrate wall 15 of furnace 16. The first ends 4 of the tubes are outside the furnace 16, and the second ends 5 of the tubes are inside the furnace 16. Other heating arrangements are possible.

An obstruction or device 17 may be disposed within the inner tube 3. The device 17 may comprise any suitable structure that enhances the heat transfer coefficient between the inner tube 3 and a fluid flowing through the inner tube 3. For example, the device 17 may comprise a disc-shaped or cylindrical blockage, an obstructed tube having one or more obstructions therein to prevent fluid flow therethrough, or the like. In some embodiments the obstruction or device 17 may comprise a third tube 18 for which the flow of a fluid through the third tube 18 is blocked by blockage 19 at one or more locations. The obstruction or device 17 for enhancing heat transfer may extend along any portion or portions of the distance between the first end 4 and the second end 5 of the first and second tubes 2, 3. It has been experimentally discovered that the second annulus formed between the inner tube 3 and the third tube 18 should have a cross-sectional area less than 0.6 times, for example, and preferably less than 0.15 times, the cross-sectional area of the first annulus 6 to obtain advantageous heat transfer between the inner tube and the gas in the inner tube.

The third tube 18 may extend along some or all of the length of the inner tube 3. For example, in some embodiments, the third tube 18 extends from the first end 4 of the tubes to the distance at which the outer tube 2 and the inner tube 3 penetrate the wall 15 of the furnace 16 and does not extend into the furnace 16. In some embodiments, the device 17 or third tube 17 extends along less than 90% of the distance from the first end 4 to the second end 5, less than 70% of the distance from the first end 4 to the second end 5, or less.

In some embodiments, the second tube contains insulation 20 to impede heat transfer between the inner tube 3 and fluid within the inner tube 3. For example, the insulation 20 may extend the from location at which the outer tube 2 and the inner tube 3 enters the furnace 16 to the second end 5 of the inner tube 3, or another length along the inner tube 3. Advantageously, the insulation 20 may reduce the amount of heat transferred from the return gas to the reacting gas along the portion of the first annulus 6 located within the furnace 16.

In some embodiments, a second catalytic reactor 21 is disposed within the inner tube 3 proximate the second end 5 of the inner tube 3. For example, the second catalytic reactor 21 may be in the form of a structured packing or any other form suitable for steam reforming. Second catalytic reactor 21 may include a catalyst coated structured packing having an axis where the packing comprises a plurality of passages parallel to the axis and to the inner tube 3, such as honeycomb catalytic reactors, for example. Steam reforming performed within the second catalytic reactor 21 may be adiabatic or substantially adiabatic.

Substrates of catalytic reactors according to the present technology may be composed of metal or ceramic, for example.

In some embodiments, the catalyst in the first annulus is at least partly disposed outside the furnace 16 and is suitable for promoting the steam reforming reactions at temperatures less than 600° C. The catalyst may contain Ni, Pt, Pd, Rh, and/or Re, for example.

For steam reforming purposes the inner tube 3 and any devices or insulation within the inner tube 3 may be constructed of materials that are resistant to metal dusting corrosion, including the use of relatively less corrosion resistant alloys coated with a corrosion resistant coating such as aluminum.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

What is claimed is:

1. A bayonet catalytic reactor comprising:
an outer tube having an open first end and a closed second end;
an inner tube disposed at least partially within the outer tube, the inner tube having an open first end and an open second end; and
a catalytic reactor comprising a structured packing disposed within an annulus defined by an inner diameter of the outer tube and an outer diameter of the inner tube,
wherein the outer diameter of the inner tube is at least 0.45 times the inner diameter of the outer tube,
wherein the second ends of the outer tube and the inner tube are disposed within a furnace, and wherein the first ends of the outer tube and the inner tube are disposed outside the furnace.

2. The bayonet catalytic reactor of claim 1, wherein the outer diameter of the inner tube is at least 0.63 times the inner diameter of the outer tube.

3. The bayonet catalytic reactor of claim 1, wherein the outer diameter of the inner tube is at least 0.77 times the inner diameter of the outer tube.

4. The bayonet catalytic reactor of claim 1, further comprising a second catalytic reactor disposed within the inner tube proximate the second end of the inner tube.

5. The bayonet catalytic reactor of claim 4, wherein the second catalytic reactor is a structured reactor comprising a honeycomb catalytic reactor.

6. The bayonet catalytic reactor of claim 4, wherein the second catalytic reactor extends from the second end of the inner tube toward the first end of the inner tube to a distance less than 50% of the distance from the second end of the inner tube to the first end of the inner tube.

7. The bayonet catalytic reactor of claim 1, wherein the bayonet catalytic reactor is a steam reforming reactor.

8. The bayonet catalytic reactor of claim 1, further comprising insulation disposed within the inner tube, the insulation configured to impede heat transfer between gas flowing through the annulus and gas flowing through the inner tube.

9. A bayonet catalytic reactor comprising:
an outer tube having an open first and end a closed second end;
an inner tube disposed at least partially within the outer tube, the inner tube having an open first end and an open second end;
a catalytic reactor comprising a structured packing disposed within a first annulus defined by an inner diameter of the outer tube and an outer diameter of the inner tube;
a device disposed within the inner tube, the device configured to enhance heat transfer between the inner tube and a fluid flowing within the inner tube; and
a third tube having a blockage therein preventing fluid flow through the third tube, wherein a second annulus is defined by an inner diameter of the inner tube and an outer diameter of the third tube.

10. The bayonet catalytic reactor of claim 9, wherein the second annulus has a cross sectional area less than 0.6 times a cross-sectional area of the first annulus.

11. The bayonet catalytic reactor of claim 9, wherein the second annulus has a cross sectional area less than 0.15 times a cross-sectional area of the first annulus.

12. The bayonet catalytic reactor of claim 9, wherein the second ends of the outer tube and the inner tube are disposed within a furnace, and wherein the first ends of the outer tube and the inner tube are disposed outside the furnace.

13. The bayonet catalytic reactor of claim 9, wherein the device extends from the first end of the inner tube toward the second end of the inner tube to a distance less than 90% of the distance from the first end of the inner tube to the second end of the inner tube.

14. The bayonet catalytic reactor of claim 9, wherein the device extends from the first end of the inner tube toward the second end of the inner tube to a distance less than 70% of the distance from the first end of the inner tube to the second end of the inner tube.

15. The bayonet catalytic reactor of claim 9, further comprising a second catalytic reactor disposed within the inner tube proximate the second end of the inner tube.

16. The bayonet catalytic reactor of claim 15, wherein the second catalytic reactor is a structured reactor comprising a honeycomb catalytic reactor.

17. The bayonet catalytic reactor of claim 15, wherein the second catalytic reactor extends from the second end of the inner tube toward the first end of the inner tube to a distance less than 50% of the distance from the second end of the inner tube to the first end of the inner tube.

18. The bayonet catalytic reactor of claim 9, wherein the reactor is a steam reforming reactor.

19. The bayonet catalytic reactor of claim 9, further comprising insulation disposed within the inner tube, the insulation configured to impede heat transfer between gas flowing through the first annulus and gas flowing through the inner tube.

20. A bayonet catalytic reactor comprising:
an outer tube having an open first and end a closed second end;
an inner tube disposed at least partially within the outer tube, the inner tube having an open first end and an open second end;
a catalytic reactor comprising a structured packing disposed within a first annulus defined by an inner diameter of the outer tube and an outer diameter of the inner tube; and
a device disposed within the inner tube, the device configured to enhance heat transfer between the inner tube and a fluid flowing within the inner tube;
wherein the second ends of the outer tube and the inner tube are disposed within a furnace, and wherein the first ends of the outer tube and the inner tube are disposed outside the furnace.

* * * * *